United States Patent
Bruns

(10) Patent No.: US 9,032,715 B2
(45) Date of Patent: May 19, 2015

(54) METHOD OF INCREASING VOLUMETRIC THROUGHPUT OF INTERNAL COMBUSTION ENGINES USED IN VAPOR DESTRUCTION APPLICATIONS

(75) Inventor: Bernhardt R. Bruns, Newport Beach, CA (US)

(73) Assignee: BRB/SHERLINE, INC., Coto de Caza, CA (US)

( * ) Notice: Subject to any disclaimer, the term of this patent is extended or adjusted under 35 U.S.C. 154(b) by 26 days.

(21) Appl. No.: 13/425,882

(22) Filed: Mar. 21, 2012

(65) Prior Publication Data

US 2012/0240555 A1  Sep. 27, 2012

Related U.S. Application Data

(60) Provisional application No. 61/467,242, filed on Mar. 24, 2011.

(51) Int. Cl.
| | |
|---|---|
| *F01N 3/00* | (2006.01) |
| *F01N 3/10* | (2006.01) |
| *F01N 1/14* | (2006.01) |
| *F01N 3/05* | (2006.01) |

(Continued)

(52) U.S. Cl.
CPC .. *F01N 3/10* (2013.01); *F01N 1/14* (2013.01); *F01N 3/055* (2013.01); *F01N 3/08* (2013.01); *F01N 3/306* (2013.01); *F01N 3/32* (2013.01); *F01N 5/04* (2013.01); *F01N 13/008* (2013.01); *F01N 13/082* (2013.01); *F01N 2240/02* (2013.01); *F01N 2270/00* (2013.01); *F01N 2430/06* (2013.01); *F01N 2560/023* (2013.01); *F01N 2610/085* (2013.01); *F01N 2610/10* (2013.01); *F01N 2900/1402* (2013.01); *Y02T 10/16* (2013.01); *Y02T 10/20* (2013.01); *F02M 35/10222* (2013.01); *F02M 23/00* (2013.01); *F02M 25/06* (2013.01); *Y02T 10/121* (2013.01)

(58) Field of Classification Search
USPC ........... 60/274, 280, 289, 293, 298, 299, 303, 60/320, 321, 278, 286, 287
See application file for complete search history.

(56) References Cited

U.S. PATENT DOCUMENTS

| | | |
|---|---|---|
| 2,589,788 A | 3/1952 | Fell |
| 3,656,915 A | 4/1972 | Tourtellotte |

(Continued)

FOREIGN PATENT DOCUMENTS

| | | |
|---|---|---|
| DE | 4020990 | 1/1991 |
| DE | 102010023082 | 12/2011 |

(Continued)

OTHER PUBLICATIONS

Jun. 4, 2012 International Search Report and Written Opinion for PCT Application No. PCT/US2012/027321 filed on Mar. 1, 2012, the PCT counterpart of the current application.

(Continued)

*Primary Examiner* — Binh Q Tran
(74) *Attorney, Agent, or Firm* — Knobbe Martens Olson & Bear, LLP

(57) ABSTRACT

A method and device for controlling emissions of VOC's comprises transporting VOC's to an engine and transporting the exhaust from the engine into a manifold. Supplemental air is transporting into the manifold and heat is transferred from the exhaust to the supplemental air within the manifold. The supplemental air is mixed with the exhaust and the mixture is transferred to a pollution abatement device.

22 Claims, 1 Drawing Sheet

(51) Int. Cl.
*F01N 3/08* (2006.01)
*F01N 3/30* (2006.01)
*F01N 3/32* (2006.01)
*F01N 5/04* (2006.01)
*F01N 13/00* (2010.01)
*F01N 13/08* (2010.01)
*F02M 35/10* (2006.01)
*F02M 25/06* (2006.01)
*F02M 23/00* (2006.01)

(56) References Cited

U.S. PATENT DOCUMENTS

| | | | |
|---|---|---|---|
| 3,947,544 A | 3/1976 | Yamada et al. | |
| 4,116,006 A | 9/1978 | Wallis | |
| 4,846,134 A | 7/1989 | Perry et al. | |
| 5,035,117 A | 7/1991 | Drake | |
| 5,050,603 A | 9/1991 | Stokes et al. | |
| 5,435,141 A | 7/1995 | Rose | |
| 5,456,240 A | 10/1995 | Kanesaka | |
| 5,519,992 A * | 5/1996 | Hosoya et al. | 60/276 |
| 5,753,188 A * | 5/1998 | Shimoda et al. | 422/108 |
| 5,890,365 A | 4/1999 | Sisti | |
| 6,095,101 A | 8/2000 | Pederson | |
| 6,295,973 B1 | 10/2001 | Yang | |
| 6,467,271 B2 | 10/2002 | Youn | |
| 6,543,398 B1 | 4/2003 | Roberts, Jr. et al. | |
| 6,564,545 B1 | 5/2003 | Dong | |
| 6,786,209 B2 | 9/2004 | Stewart | |
| 7,721,541 B2 | 5/2010 | Roberts, Jr. et al. | |
| 7,792,626 B2 | 9/2010 | Eriksson et al. | |
| 8,046,989 B2 * | 11/2011 | VanderGriend et al. | 60/317 |
| 8,336,302 B2 * | 12/2012 | Nakahira | 60/303 |
| 8,429,896 B2 * | 4/2013 | Pekrul et al. | 60/282 |
| 2002/0100277 A1 | 8/2002 | Youn | |
| 2006/0053776 A1 | 3/2006 | Ancimer et al. | |
| 2006/0179824 A1 | 8/2006 | Roser | |
| 2012/0222640 A1 | 9/2012 | Bruns | |

FOREIGN PATENT DOCUMENTS

| | | |
|---|---|---|
| FR | 2 900 964 | 11/2007 |
| GB | 1 359 660 | 7/1974 |
| GB | 1 518 132 | 7/1978 |
| JP | 08-028253 | 1/1996 |
| JP | 10-009039 | 1/1998 |
| JP | 2005/319452 | 11/2005 |
| WO | WO 2005/008031 | 1/2005 |
| WO | WO 2008/050463 | 5/2008 |

OTHER PUBLICATIONS

Jul. 5, 2012 PCT Search Report and Written Opinion for PCT Application No. PCT/US2012/029989 filed on Mar. 21, 2012, the foreign counterpart of the present application.

* cited by examiner

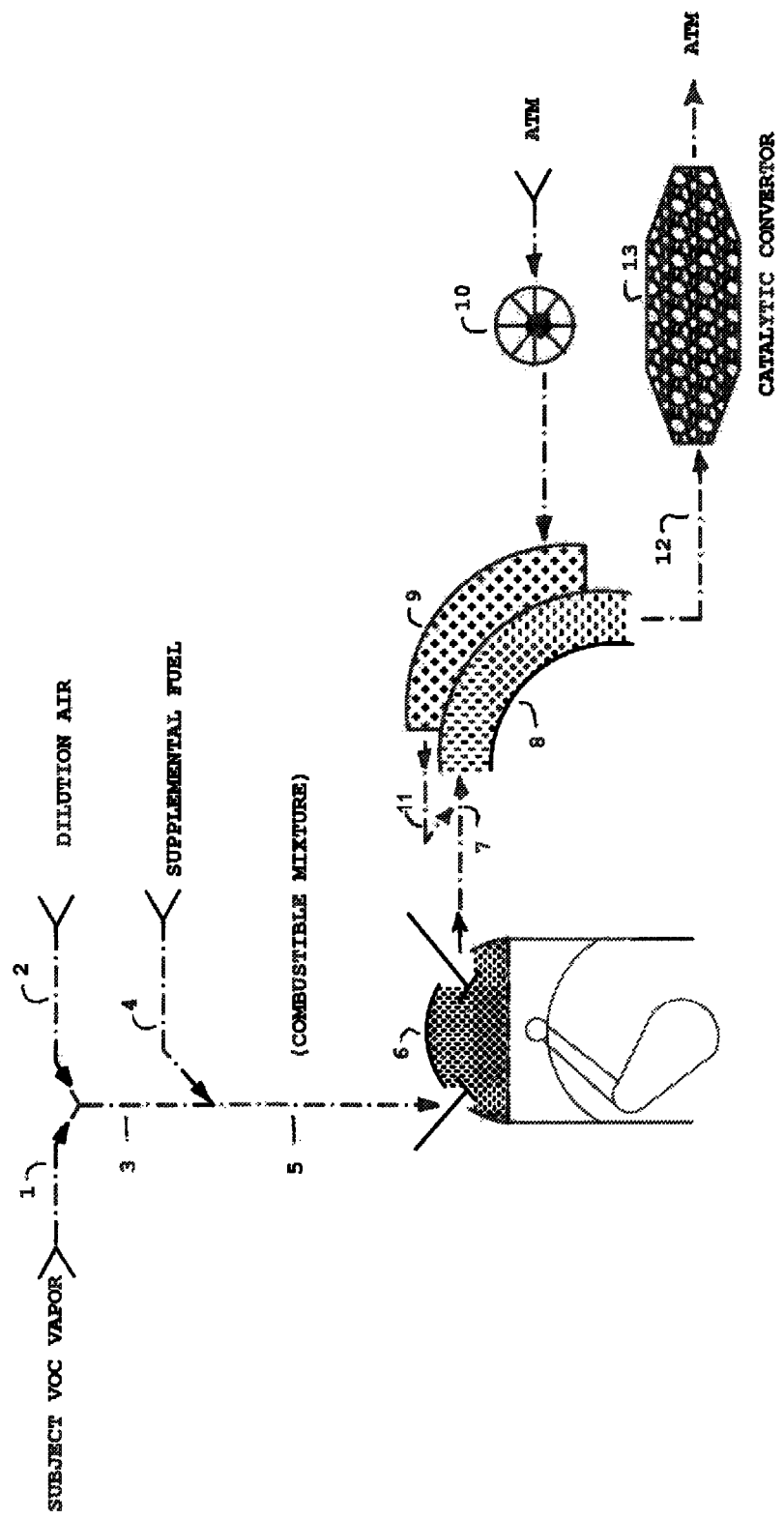

METHOD OF INCREASING VOLUMETRIC THROUGHPUT OF INTERNAL COMBUSTION ENGINES USED IN VAPOR DESTRUCTION APPLICATIONS

PRIORITY

The present application claims the benefit of U.S. Provisional Application No. 61/467,242, filed Mar. 24, 2011, the disclosure of which is hereby incorporated by reference herein in its entirety.

BACKGROUND

1. Field

The embodiments disclosed herein relate to a system and method for controlling emission of Volatile Organic Compounds and, more specifically, to an improved system and method for increasing volumetric throughput through an internal combustion engine used to control Volatile Organic Compounds.

2. Description of the Related Art

The direct release of Volatile Organic Compounds (VOC's) into the atmosphere has been for some time now recognized as a primary contributing factor in affecting ozone concentrations in the lower atmosphere. The EPA has established standards for safe levels of ozone, and local air quality districts have implemented regulations and mandated control measures pertaining to the release of hydrocarbon vapors into the atmosphere, from operations such as soil remediation, storage tank inerting, and storage vessel loading and unloading; that have been identified as sources of hydrocarbon emissions responsible for impacting ozone levels.

The process of treating these vapors, through any of a variety of methods, is typically referred to as "degassing"; which is either the collection or on-site destruction of these vapors as an environmentally responsible alternative to their otherwise direct release into the atmosphere.

The internal combustion engine, as well as open-flare incinerator units, have been employed for several decades as a means of on-site destruction of these VOC's by elemental combustion. The combustion process does itself give rise to the undesirable production of carbon monoxide and nitrogen oxides; however this has been accepted as a reasonable consequence for the nearly 99% efficiency in the destruction of hydrocarbon based VOCs. These consequential emissions are accepted, but tolerated only to a regulated extent, and are also a factor to be considered in engines and incinerators employed in vapor destruction applications. The maximum permissible limits of consequential hydrocarbon, carbon monoxide and nitrogen oxide emissions are regulated to different standards within different air quality regions.

The many different VOC's typically subject to treatment represent a wide range of hydrocarbons between C1 through C10 along with their corresponding alcohols and ketones. Each of these individual compounds is characterized by having unique upper and lower flammability limits, expressed as a range of concentration in atmospheric air within which a source of ignition results in combustion of the mixture. This data is well established and widely published; along with the stoichiometric mixture ratio for each of these compounds, defined as the theoretically ideal mixture at which combustion will be complete without a remaining excess of either air or fuel. Generally, combustion is most complete with a slight excess of air, approximately 15%, being slightly leaner than the theoretical stoichiometric mixture concentration.

The internal combustion engine, as well as open-flare incinerator units, have been employed for several decades as a means of on-site destruction of these Volatile Organic Compounds by elemental combustion; but each with slightly different performance characteristics. In the case of the open-flare incinerator unit; the VOCs to be processed are typically introduced at a vapor concentration equivalent to or less than the lower explosion limit and passed over a continuously maintained flame source responsible for combustion of the subject VOCs. Open-flare incinerator units are able to support combustion of the introduced VOCs at concentrations less than the lower explosion limit by virtue that the flame front has already been established by a continuously maintained pilot flame. The disadvantage of the open-flare incinerator unit is that the inlet concentration is limited by the ability of the unit to dissipate the amount of heat generated by the combustion of VOCs, based upon the heat content of the VOCs undergoing treatment. A further disadvantage of open-flare incinerator type units is that greenhouse gasses ($CO_2$) are continuously generated by the pilot flame without relation to the mass quantity of VOCs being processed.

In the case of the internal combustion engine employed in vapor destruction applications, the resultant heat produced from combustion of the VOCs is very effectively handled by the engine cooling system, affording VOC concentrations in the upper range approaching the upper explosion limit. The internal combustion engine is also self-sustaining in that the fuel source is entirely that of the subject VOC itself and does not require any addition of fossil fuel until the concentration of subject VOC falls below the lower explosion limit of the subject VOC undergoing treatment.

It is important to note that the aforementioned values of lower and upper explosion limits as defined for subject VOC's undergoing treatment was established in a laboratory setting and under the thermodynamic principles of a constant pressure (Cp) type process. Actual conditions of combustion within the internal combustion engine, whether spark ignited or compression ignited, more closely resemble combustion characteristic of a "constant volume" (Cv) type process and typically must therefore be adjusted. This adjustment is on the order of approximately 15% above the lower explosion limit (herein defined as the lean limit), and approximately 15% below the upper explosion limit (herein defined as the rich limit).

Because the many VOCs typically subject to treatment are too numerous to elaborate herein, gasoline vapor has been selected as the model for purposes of discussion. In selecting gasoline vapor; it is herein defined as having an upper explosion limit of 7.5%/vol; with a lower explosion limit of 1.5%/vol; and a stoichiometric value of 4.5%/vol. Adjusting these values for practical combustion ranges within the internal combustion engine operating under the thermodynamic principals of a constant volume combustion process; the rich limit is defined as 6.5%, the lean limit as 2%, and the stoichiometric ratio as 4.5%. There are many factors which could influence these specific values; but these values are selected for the purpose of discussion herein.

The internal combustion engine employed in vapor destruction applications has traditionally been that of the "lean-burn" type; wherein the process vapor is introduced at a concentration value less than stoichiometric and more closely approximating that of the lean-limit for the subject VOC. At this lean mixture, the resultant emissions with regard to hydrocarbons and carbon monoxide, tend to be at their lowest value, and remain low up to the lean-limit where after combustion is no longer possible. Oxides of nitrogen emissions tend to increase dramatically on the immediate lean side of stoichiometric, but then fall in value as the mixture becomes increasingly lean up to the lean limit. These engines are typically fitted with "reduction/oxidation" type catalytic convertors as a final polish to the exhaust stream prior to emitting into the atmosphere.

Although lean-burn operation is a sought after objective for modern engines employed in power producing applications, such as motor vehicle and industrial power applications wherein fuel efficiency and minimal exhaust emissions are of primary concern; this is not the ideal configuration for such engines employed in vapor destruction applications wherein maximum fuel consumption in terms of vapor processing volumetric throughput are of primary interest.

SUMMARY

A lean-burn engine employed in processing gasoline vapor equates to a vapor processing rate of 2% of the total volumetric throughput of the engine. In the case of the engine with a total displacement volume of 500 cfm, this equates to a VOC processed volume of: [500(0.02)], or 10 cfm. The same engine operating in rich-burn mode, processing vapor at 6% by volume equates to a VOC processed volume of: [500 (0.06)], or 30 cfm. This is a 3-fold increase being a linear function of the proportionate increase in vapor concentration up to the rich-limit, where after combustion is no longer possible.

Although the internal combustion engine has the inherent ability to cope with and dissipate the heat energy associated with combustion of VOCs at the upper extreme of their rich-limit, it is important to note that hydrocarbon and carbon monoxide emissions increase substantially when operating on the rich side of stoichiometric, along with a corresponding decrease in excess air within the final exhaust stream. Because most engines employed in vapor destruction applications are equipped with a catalytic convertor, requiring a certain excess of atmospheric air as part of the exhaust stream for proper catalytic convertor function, these engines must typically operate on the lean side of stoichiometric as a necessity for catalytic convertor function.

The internal combustion engine, as part of prior art employed in vapor destruction applications, has been limited in realizing its full potential in terms of volumetric throughput of processed vapors; due to the natural increase in hydrocarbon and carbon monoxide emissions associated with rich-burn operation, and also that of requiring an excess of air in the final exhaust stream essential to support proper catalytic convertor operation.

Accordingly, one embodiment comprises a system for controlling emissions of VOC's by combustion of said VOC's in an internal combustion engine. The system can include an inlet conduit for connection to a source of VOC's, an internal combustion engine that is connected to the inlet conduit; exhaust path that receives exhaust from the internal combustion engine and an air source of supplemental air. A manifold comprises a first conduit that receives the exhaust from the exhaust path and a second conduit that receives supplemental air from the air source. The manifold is configured to transfer heat from the exhaust in the first conduit to the supplemental air in the second conduit. An abatement device is in fluid communication with the first conduit downstream of the manifold. A fourth conduit is in communication with the first conduit upstream of the abatement device.

In another embodiment, a method of controlling emissions of VOC's comprises transporting VOC's to an engine and transporting exhaust from the engine into a manifold. Supplemental air is transported into the manifold and heat is transferred from the exhaust to the supplemental air within the manifold. The supplemental air is mixed with the exhaust and at least a portion of the supplemental air and exhaust mixture is transported into a pollution abatement device.

Other embodiments and arrangements are described below.

BRIEF DESCRIPTION OF THE DRAWINGS

FIG. 1 is a schematic illustration a degassing system according to one embodiment.

DETAILED DESCRIPTION OF THE PREFERRED EMBODIMENTS

As described herein, one embodiment can include a method of employing secondary "thermal oxidation" for increased volumetric throughput and reduced hydrocarbon and carbon monoxide emissions from internal combustion engines employed in "degassing" operations. As described herein, "degassing" operations is intended to be a broad term that can be generally defined as the destruction of Volatile Organic Compounds, by elemental combustion, of hydrocarbon vapors emanating from soil remediation, in situ process streams, pipelines and storage vessels; as an environmentally responsible alternative to the otherwise direct release of these vapors into the atmosphere. In other embodiments, the degassing operations can also be applied to other compounds and/or from sources other than those listed above.

One advantage of certain embodiments is that an internal combustion engine, as employed in certain embodiments, can operate at richer than stoichiometric mixtures for greater vapor processing capability without consequential increase in the production of hydrocarbon and carbon monoxide emissions typically associated with rich-burn engines; and while also reducing oxides of nitrogen emissions inherent to internal combustion engines capable of operating on the rich side of stoichiometric air/fuel ratios.

One advantage of the certain embodiments is that they allows the internal combustion engine as typically employed in vapor destruction applications to operate at the upper range of the flammability limit for the VOC being processed, without the corresponding increase in hydrocarbon and carbon monoxide emissions normally associated with operation in this upper range, and provides a method to an exhaust stream containing sufficient excess air to support proper catalytic convertor operation.

Certain embodiments allow the internal combustion engine to operate at greater than stoichiometric mixture ratios for the particular VOC being processed, by providing an intermediate stage of combustion immediately following combustion within the engine, that allows combustion to proceed under lean-burn constant-pressure conditions in an environment of excess air that not only supports more complete combustion but also provides sufficient excess air in the final exhaust stream essential to support proper catalytic convertor operation.

In one arrangement, the exhaust stream immediately following exhaust from combustion within the engine can be passed (e.g., via a conduit) into a heated manifold wherein air is injected (e.g., via a conduit) from an outside source such to effectively reduce the relative concentration and assimilate combustion under lean-burn and constant-pressure conditions with sufficient excess air necessary to support subsequent introduction to the catalytic convertor for a final polish before finally being emitted to the atmosphere.

In such arrangements, a several-fold increase in the volumetric throughput of processed vapors within the fixed displacement of the engine itself, without increase in exhaust emissions typically associated with operation in rich-burn mode, and provides also sufficient excess air in the final exhaust stream necessary to support proper catalytic convertor operation.

FIG. 1 is a schematic illustration of one embodiment of a degassing system. In the illustrated embodiment, the subject VOC is introduced into the system at point (1). In the case of soil remediation or in situ process streams (for example), the vapor concentration at point (1) may remain very constant or substantially constant at some value ranging between 0% to 100%/volume over an indefinite period of time. In the case of processing a fixed volume of VOC vapors, such as from storage vessels, the concentration at point (1) can commence at a value of 100%/volume concentration and can eventually fall to 0%/volume at the conclusion of the "degassing" event. Accordingly, the VOC concentration measured at point (1) can be a variable that may change over time.

In the illustrated embodiment, when the vapor concentration as measured at point (1) is substantially equal to or greater than the upper explosion limit (or some calculated or predetermined reference value), or more accurately the predetermined "rich-limit" for the subject VOC; dilution air can be introduced at point (2) such that the vapor concentration as measured at point (3) is equal to the predetermined "rich-limit". When the vapor concentration as measured at point (1) falls below the upper explosion limit, or the predetermined "rich-limit", dilution air is no longer required. When the vapor concentration as measured at point (1) falls substantially below the lower explosion limit (or some calculated or predetermined reference value), or the predetermined "lean-limit"; a supplemental fuel (such as methane or propane or other) can be introduced at point (4) such that the combustible mixture as measured at point (5) is equal to or substantially equal to the "lean-limit" necessary to sustain combustion within the engine. When the subject vapor concentration as measured at point (1) falls within the range of the "rich" and "lean" limit; neither dilution air nor supplemental fuel are necessary to form a combustible mixture. Accordingly, in one embodiment, the VOC vapors being processed, can be introduced at a concentration ranging from 100%/vol to 0%/vol and combustion is still supported within the engine employed in vapor destruction processes, and can thereby process the subject VOC vapors to 0% in vapor destruction "degassing" operations.

An advantage of the internal combustion engine employed in vapor destruction applications is its inherent ability to cope with the combustion heat generated from operation in the upper range of the flammability limit. In the case of the engine processing gasoline vapor, this equates to a concentration value of approximately 6% versus the approximate 2% normally associated with engines operating in lean-burn mode of operation.

When the vapors to be processed are introduced into the engine at the lean-limit (e.g. 2% for gasoline); the volumetric throughput for an internal combustion engine with a displacement volume of 500 cfm becomes:

[(0.02)500]=10 cfm processed vapors(in lean-burn mode)

When this same engine is operated in rich-burn mode, wherein the vapors to be processed are introduced at their "rich-limit" (e.g. 6% for gasoline); the volumetric throughput for the same engine with a displacement volume of 500 cfm becomes:

[(0.06)500]=30 cfm processed vapors(in rich-burn mode)

Although the numbers are only relative, it represents a 3-fold increase in volumetric throughput for the same engine when operated in this rich-burn mode.

One associated benefit with operation in rich-burn mode, is that oxides of nitrogen emissions tend to be at their lowest values due to reduced combustion temperatures and the increased heat capacity of the system. The primary disadvantage however; is that hydrocarbon and carbon monoxide emissions tend to increase substantially due to the absence of sufficient excess air to facilitate complete combustion, and the absence of sufficient excess air in the final exhaust stream essential to proper catalytic convertor operation. A certain excess of nitrogen is essential to the reduction phase of the catalyst, and a certain excess of atmospheric oxygen is essential to the oxidation phase of the catalyst.

The embodiments describe herein can allow the engine to operate in rich-burn mode for maximum volumetric throughput of processed vapors, while still providing sufficient excess air in the exhaust stream to facilitate complete combustion and with sufficient excess air in the final exhaust stream necessary for proper catalyst function.

With continued reference to FIG. 1, a conduit transfers the VOC vapors and any dilution air and/or supplemental fuel to the engine 6. As the engine 6 operates an exhaust stream is generated and transferred to a conduit. Atmospheric air can be introduced into the exhaust stream as it leaves the combustion chamber at point (7) in the conduit before the exhaust stream passes into the thermal oxidizer exhaust manifold (8). The atmospheric air can be supplied by source (10), which can be either an exhaust driven turbocharger, roots blower, or other source such as an external air compressor. The conventional turbocharger, properly selected for the application, is herein suggested as a proven and preferred method due to its compact size but more importantly the ability to closely regulate its volumetric output with a minimum of complex controls.

In the illustrated arrangement, the introduced air from source (10) can be passed through an annular space (9) surrounding the thermal oxidizer exhaust manifold (8) in such a way that the natural heat of the exhaust gas passing through the manifold is transferred to the introduced air. This serves not only to provide cooling to the manifold from the hot exhaust gas passing within, but also imparts this heat to the introduced air stream such to maintain an elevated temperature (e.g., approximately 1200 F in one arrangement) at the point wherein this air is injected to the exhaust stream as it leaves the combustion chamber at point (7). If the introduced air is not maintained at this elevated temperature, then gas phase termination of active specie in the exhaust gas could occur; resulting in excessive hydrocarbon and carbon monoxide emissions. The manifold may or may not be fitted with insulation (not shown) to aid in retaining the natural heat within the manifold and imparting this heat to the introduced air rather than the surrounding environment. The mixture of exhaust gases and heated supplemental air can then be transferred via a conduit 12 to the catalytic convertor 13. A conduit (11) is upstream of the catalytic converter (13) and/or the manifold (8).

In order to determine the amount of supplemental air necessary to be introduced in converting from lean-burn to rich-burn mode of operation; in one embodiment, the vapor concentration associated with operation under lean mode of operation is determined and the amount of normal engine air based upon the fixed displacement volume of the engine is determined.

For example, in the arrangement of the engine with a displacement volume of 500 cfm, operated in lean-burn mode having a vapor concentration of 2%:

engine air=(98%)500=490 cfm

VOC volume=(2%)500=10 cfm

The amount of supplemental air required for conversion to rich-burn (6% concentration) therefore becomes:

[(Crich/Clean)−1](engine air)=supplemental air or in this case:

[(0.06/0.02)−1](490)=supplemental air=980 cfm

The amount of excess air now present in the exhaust stream by the addition of supplemental air is such to return the total mixture to the equivalent of operation in lean-burn mode, as:

30/(490+980)=2%/volume=(original lean-burn conditions)

It is interesting to note also that although the total heat capacity of the system within the thermal oxidizer manifold has increased by the addition of supplemental air, the heat produced within the system has increased commensurately; such that exhaust gas temperature remains relatively unchanged from that of operation in lean-burn mode. In certain arrangements, this can be an important factor in maintaining proper catalyst temperature.

The total volume quantity of exhaust gas passing through the catalyst, has now been increased several fold by the introduction of supplemental air; which may have a significant impact upon proper catalyst operation. Not only is there an increased concern for excessive back pressure produced in the exhaust system, but also an increase in gas density and a corresponding decrease in residence time within the catalyst, that could be detrimental to proper catalyst operation. This potential condition for the particular catalyst employed can be considerable, and the addition of a supplemental catalyst in parallel, or an appropriate retrofit can be part of a particular application.

According to certain of the embodiments described above, a method is provided by which the volumetric vapor processing capability can be increased by several fold within the internal combustion engine having a fixed displacement volume, when the vapor concentration to be processed (as measured at point 1) is greater than the upper explosion limit or the predetermined rich-limit for the particular VOC undergoing treatment. Although this can afford a several fold increase in the vapor processing capability of the system when the VOC concentration is greater than the predetermined rich-limit; such embodiments provide no improvement in the volumetric throughput of the system when the inlet concentration measured at point (1) falls below the lower lean-limit. The continued introduction of supplemental air at this point may actually be detrimental to the performance of VOC destruction in that excessive amounts of supplemental air are not needed and may be detrimental to the chemistry of proper catalyst operation in addition to reduced exhaust gas temperatures resulting in excessive cooling and reduced performance of the catalyst.

For this reason, it is suggested in certain embodiments, that the introduction of supplemental air be terminated when the subject VOC concentration as measured at point (1) falls below the predetermined lean-limit for the particular VOC undergoing treatment.

As described above, in the illustrated embodiments a reciprocating internal combustion engines is used. However, it is contemplated that other types of engines and/or internal combustion engines could be utilized in modified embodiments.

As used herein the term "conduit" is intended to be a broad term that includes, pipes, ducts and channels. In addition, a conduit need not be a separate device or element but can define portions of a longer conduit. That is, a first and second conduit can be portions or sub-sections of a larger conduit.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments can be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A system for controlling emissions of Volatile Organic Compounds (VOC's) by combustion of said VOC's in an internal combustion engine, the system comprising:
    an inlet conduit for connection to a source of VOC's,
    an internal combustion engine that is connected to the inlet conduit, the inlet conduit being upstream of the engine;
    a source of dilution air connected to the inlet conduit upstream of the engine;
    a source of supplemental fuel connected to the inlet conduit, the supplemental fuel being different from the VOC's;
    an exhaust path that receives exhaust from the internal combustion engine;
    an air source of supplemental air;
    a manifold comprising a first conduit that receives the exhaust from the exhaust path and a second conduit that receives supplemental air from the air source; and
    an abatement device in fluid communication with the first conduit downstream of the manifold; and
    a fourth conduit in communication with the first conduit upstream of the abatement device,
    wherein the amount of supplemental air received into the manifold is based on a relationship between a volume of VOC's input into the engine, a lean limit of the VOC's, and a volume of air introduced into the engine for combusting the VOC's.

2. The system of claim 1, further comprising a VOC measurement device configured to measure the amount of VOCs in the inlet conduit.

3. The system of claim 2, further comprising a control system operatively connected to the VOC measurement device, the source dilution air and the source of supplement fuel and wherein the control system is configured to adjust and amount of dilution air or supplemental fuel in response to the measured amount of VOC.

4. The system of claim 1, wherein the manifold is configured such that flow through the first conduit and the second conduit are in opposite directions.

5. The system of claim 1, wherein the abatement device is a catalytic convertor.

6. The system of claim 1, wherein the air source of supplemental air is a supercharger.

7. The system of claim 1, wherein the fourth conduit is in communication with the first conduit upstream of the manifold.

8. A method of controlling emissions of Volatile Organic Compounds (VOC's), the method comprising:
   transporting VOC's to an engine,
   adding supplemental fuel to the engine, the supplemental fuel being different from the VOC's;
   transporting exhaust from the engine into a manifold;
   transporting supplemental air into the manifold;
   mixing the supplemental air with the exhaust; and
   transporting at least a portion of the supplemental air and exhaust mixture into a pollution abatement device,
   wherein the amount of supplemental air transported into the manifold is based on a relationship between a volume of VOC's input into the engine, a lean limit of the VOC's, and a volume of air introduced into the engine for combusting the VOC's.

9. The method of claim 8, comprising adding dilution air upstream of the engine.

10. The method of claim 8, further comprising measuring VOC concentrations.

11. The method of claim 10, comprising adjusting an amount of dilution air and/or supplemental fuel in response to the measured VOC concentrations.

12. The method of claim 8, wherein the supplemental air and the exhaust flow in opposite directions through the manifold.

13. The method of claim 8, wherein the abatement device is a catalytic convertor.

14. The method of claim 8, comprising pressurizing the supplemental air.

15. The method of claim 8, comprising mixing the exhaust and the supplemental air upstream of the manifold.

16. The method of claim 8, wherein the engine is an internal combustion engine.

17. The system of claim 1, wherein the amount of supplemental air received into the manifold is proportional to a ratio of the volume of VOC's input into the engine and the lean limit of the VOC's.

18. The system of claim 17, wherein the volume of VOC's input into the engine is equal to the rich limit of the VOC's.

19. The system of claim 1, wherein the amount of supplemental air received into the manifold is proportional to the volume of air introduced into the engine for combusting the VOC's.

20. The method of claim 8, wherein the amount of supplemental air transported into the manifold is proportional to a ratio of the volume of VOC's input into the engine and the lean limit of the VOC's.

21. The system of claim 20, wherein the volume of VOC's input into the engine is equal to the rich limit of the VOC's.

22. The method of claim 8, wherein the amount of supplemental air transported into the manifold is proportional to the volume of air introduced into the engine for combusting the VOC's.

* * * * *

UNITED STATES PATENT AND TRADEMARK OFFICE
CERTIFICATE OF CORRECTION

PATENT NO. : 9,032,715 B2
APPLICATION NO. : 13/425882
DATED : May 19, 2015
INVENTOR(S) : Bernhardt R. Bruns Page 1 of 1

It is certified that error appears in the above-identified patent and that said Letters Patent is hereby corrected as shown below:

In column 8 at line 56, In Claim 3, change "and" to --an--.

In column 10 at line 21, In Claim 21, change "system" to --method--.

Signed and Sealed this
Twenty-third Day of August, 2016

Michelle K. Lee
*Director of the United States Patent and Trademark Office*